(12) United States Patent
Feuerrohr et al.

(10) Patent No.: US 8,729,767 B2
(45) Date of Patent: May 20, 2014

(54) ELECTRIC MACHINE

(75) Inventors: Lin Feuerrohr, Rutesheim (DE); Karl-Juergen Roth, Schwieberdingen (DE); Tilo Koenig, Buehl (DE); Bruno Holzwarth, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 242 days.

(21) Appl. No.: 13/320,046

(22) PCT Filed: Mar. 31, 2010

(86) PCT No.: PCT/EP2010/054265
§ 371 (c)(1),
(2), (4) Date: Jan. 23, 2012

(87) PCT Pub. No.: WO2010/136239
PCT Pub. Date: Dec. 2, 2010

(65) Prior Publication Data
US 2012/0112591 A1 May 10, 2012

(30) Foreign Application Priority Data
May 28, 2009 (DE) .......................... 10 2009 026 524

(51) Int. Cl.
*H02K 1/06* (2006.01)

(52) U.S. Cl.
USPC .............................. 310/216.074; 310/216.069

(58) Field of Classification Search
USPC .............. 310/216.69–216.74, 156.56–156.58
See application file for complete search history.

(56) References Cited

U.S. PATENT DOCUMENTS

| | | | |
|---|---|---|---|
| 5,786,650 A * | 7/1998 | Uchida et al. | 310/156.55 |
| 6,037,691 A * | 3/2000 | Akemakou | 310/191 |
| 6,768,238 B2 | 7/2004 | Knauff et al. | |
| 6,967,420 B2 * | 11/2005 | Laurent et al. | 310/156.51 |
| 7,205,695 B2 * | 4/2007 | Smith | 310/216.004 |
| 7,994,668 B2 * | 8/2011 | Gerstler et al. | 310/61 |
| 8,004,140 B2 * | 8/2011 | Alexander et al. | 310/156.56 |
| 8,018,110 B2 * | 9/2011 | Alexander et al. | 310/156.56 |
| 8,334,667 B2 * | 12/2012 | Sakai et al. | 318/494 |
| 2007/0228858 A1 | 10/2007 | Malmberg | |
| 2007/0252469 A1 | 11/2007 | Nishiura et al. | |
| 2012/0038237 A1 * | 2/2012 | Li et al. | 310/156.45 |

FOREIGN PATENT DOCUMENTS

| | | |
|---|---|---|
| EP | 0449538 | 10/1991 |
| JP | 11113198 | 4/1999 |

OTHER PUBLICATIONS

PCT/EP2010/054265 International Search Report.

* cited by examiner

*Primary Examiner* — Thanh Lam
(74) *Attorney, Agent, or Firm* — Michael Best & Friedrich LLP

(57) ABSTRACT

An electric machine (1), particularly used as an electric motor, has a rotor (2) comprising a plurality of disks (4). A disk (4) of the rotor (2) is divided in a circumferential direction (5) into a plurality of disk sectors (6, 7, 8) between which magnetic pockets (9, 10) are designed. Furthermore, the disk (4) has an inner fastening collar (15) and connecting members (20, 23, 24) connecting the disk sectors (6, 7, 8) to the fastening collar (15). Such a connecting member (20) comprises a main web (21), a side arm (30) branching off the main rib (21) in the circumferential direction (5), and a side arm (31) branching off the main web (21) opposite to the circumferential direction (5). High mechanical stability of the disk (4) can thus be ensured, wherein magnetic flow losses are reduced.

20 Claims, 3 Drawing Sheets

ELECTRIC MACHINE

BACKGROUND OF THE INVENTION

The invention relates to an electrical machine, in particular an electric motor having a rotor and a shaft. In particular, the invention relates to the field of electric motors for motor vehicles, in particular electric motors which are used as electrical auxiliary drives for movement, operated by external power, or for assistance to movement, of elements of a motor vehicle.

US 2007/0252469 A1 discloses an electric motor having laminates, with magnets being provided in cutouts which extend through the rotor core in the axial direction. These cutouts also have a radial extent. The configuration of the rotor reduces the magnetic flux losses as much as possible.

The electric motor which is known from US 2007/0252469 A1 has the disadvantage that flux losses occur via the laminates, or the mechanical load capacity is considerably reduced, depending on the configuration.

SUMMARY OF THE INVENTION

The electrical machine according to the invention has the advantage that an embodiment is improved with respect to magnetic flux losses and mechanical load capacity. In particular, magnetic flux losses for a predetermined mechanical load capacity can be reduced, or a mechanical load capacity can be improved for predetermined magnetic flux losses.

The laminates of the rotor can be joined to a shaft individually, or preassembled as a laminate core, or by means of a plurality of laminate cores. For this purpose, the laminates and/or the laminate cores are at least indirectly connected to the shaft. A plurality of laminates of the rotor, in particular all or virtually all of the laminates of the rotor, have a plurality of laminate sectors in the circumferential direction, between which laminate sectors the magnet pockets are formed, with each of the laminates having an inner attachment crown, with each of the laminates having connection elements which connect the laminate sectors to the attachment crown, and with each of the connection elements having a main web, at least one side arm which branches off from the main web in the circumferential direction, and at least one side arm which branches off from the main web in the opposite direction to the circumferential direction.

It is advantageous that one and only one side arm branches off from the main web in the circumferential direction, and/or that one and only one side arm branches off from the main web in the opposite direction to the circumferential direction. This allows a robust configuration of the laminate. The production of the laminate is furthermore simplified and, for example, it may be formed by stamping from a metal sheet. The laminate, which comprises the attachment crown, the connection elements and the laminate sectors, is in this case preferably stamped integrally from a metal sheet.

However, another advantage is that a further side arm branches off from the main web at a distance from the side arm in the circumferential direction, and/or that a further side arm branches off from the main web at a distance from the side arm in the opposite direction to the circumferential direction. This allows the main web of the connection element to be connected in each case by two or more arms to the respective laminate sector, both in the circumferential direction and in the opposite direction to the circumferential direction. The configuration of the side arms may in this case be optimized for loads which occur, in particular stresses in the material. In particular, the material of the laminate can be omitted in areas which contribute only a small amount to the component strength, in order to minimize flux losses.

In this case, another advantage is that the side arm and the further side arm, which branch off from the main web in the circumferential direction, run together at least in places in the circumferential direction, and that the side arm and the further side arm, which branch off from the main web in the opposite direction to the circumferential direction, run together at least in places in the opposite direction to the circumferential direction starting from the main web. This results in an optimized geometry in which the material of the side arms contributes particularly well to the component strength. The side arms can therefore be made relatively thin, in order to minimize magnetic flux losses.

It is also advantageous that the main web of the connection element leads to the attachment crown. In this embodiment, the side arms of the connection elements lead to the individual laminate sectors.

In this case, it is advantageous that the side arms of each connection element each lead to one laminate sector, and that the side arms of a connection element and the laminate sector to which the side arms of the connection element lead surround a cutout in the laminate. Specifically, in this embodiment, it is advantageous that the connection element together with the main web and the side arms is at least approximately Y-shaped. In this embodiment, flux losses are reduced in that the flux which runs from a laminate sector having a magnetic north pole to a laminate sector having a magnetic south pole has to travel over a particularly long distance through the metal laminate sheet. In this case, it has to run not only through the upper part of the Y-shaped connection element but also through the lower part of the Y-shaped connection element, specifically the main web, and then further through the attachment crown. The path is therefore particularly long, and the magnetic flux losses are low.

It is also advantageous that the side arms of each connection element each lead to adjacent laminate sectors. It is also advantageous here that the main web of the connection element at least approximately on a radial axis of a magnet pocket, which is arranged between the adjacent laminate sectors to which the side arms of the connection element lead. This ensures that the connection of adjacent laminate sectors via the connection elements can be made highly mechanically robust. Furthermore, in this embodiment, a clamping projection can advantageously be provided on the main web, which clamping projection extends along the radial axis to the magnet pocket, with a magnet which is arranged in the magnet pocket being held in the magnet pocket by the clamping projection. The magnet is in this case preferably held in the magnet pocket by a plurality of such clamping projections of a plurality of laminates which are arranged one behind the other.

Advantageously, the attachment crown of the laminate can rest at least indirectly on the shaft, and/or can be at least indirectly attached to the shaft. In this case, clamping lugs and centering lugs may be formed on the attachment crown, which face the shaft and are used for alignment of the laminate on the shaft, and for attachment of the laminate to the shaft.

It is advantageous that the laminate sectors are connected to one another on a circumference of the laminate on the magnet pockets via webs which are arranged on the outside, or that the laminate sectors are not connected to one another on the circumference of the laminate at the magnet pockets, and holding stops are provided, on which magnets which are arranged in the magnet pockets are supported. This allows optimization to be carried out for the respective application, with respect to mechanical robustness and minimizing flux losses.

BRIEF DESCRIPTION OF THE DRAWINGS

Preferred exemplary embodiments of the invention will be explained in more detail in the following description with reference to the attached drawings, in which corresponding elements are provided with matching reference symbols, and in which.

DETAILED DESCRIPTION

Figure 1:
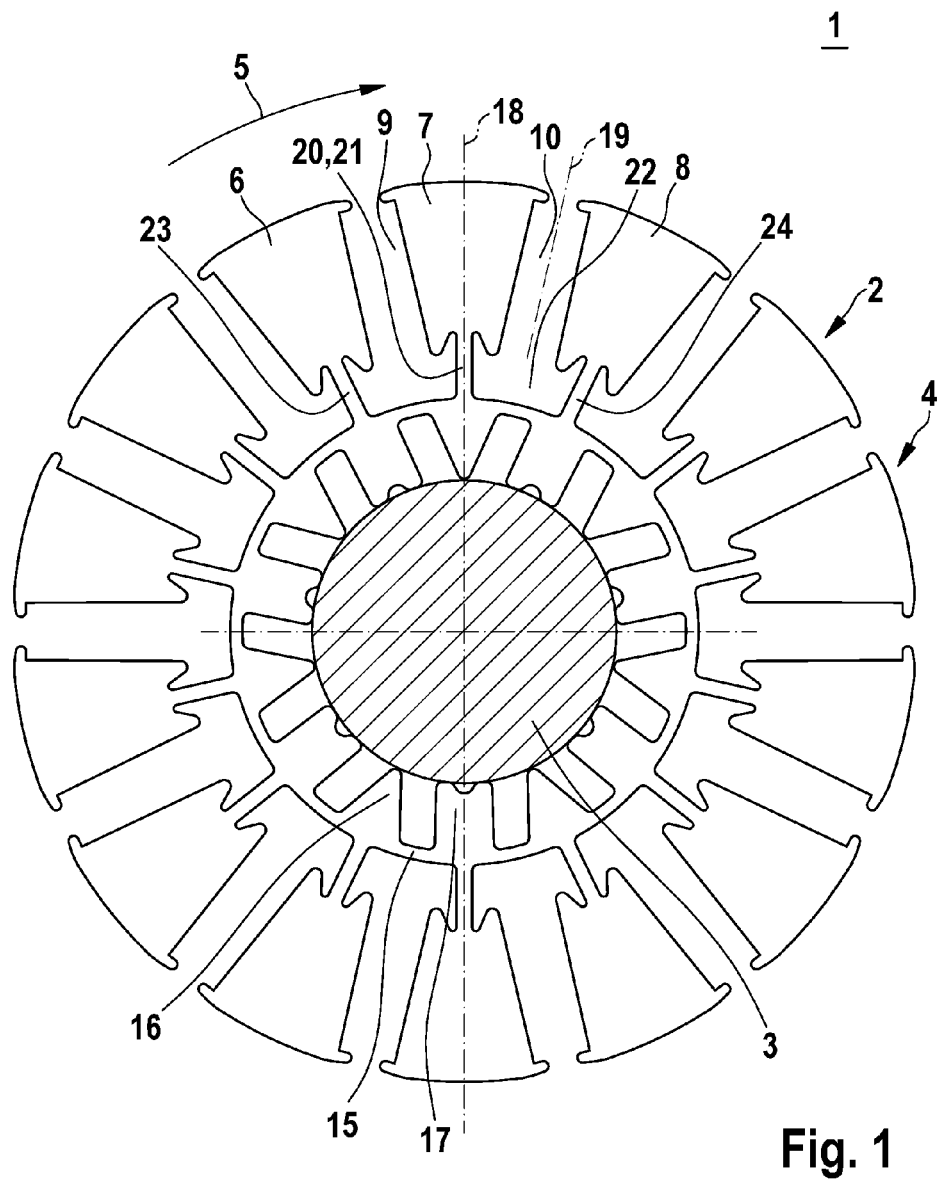
FIG. 1 shows a rotor of an electrical machine having a laminate and a shaft, in the form of a schematic illustration corresponding to a first exemplary embodiment.

FIG. 1 shows an electrical machine 1 having a rotor 2 and a shaft 3, in the form of a schematic illustration corresponding to one exemplary embodiment. In particular, the electrical machine 1 may be in the form of an electric motor and may be used for a motor vehicle. Specifically, the electrical machine 1 is suitable for movement operated by external power of elements of a motor vehicle, for example a sliding roof, a window or a seat element. Furthermore, the electrical machine 1 can be used as an electric motor for steering power assistance. The electrical machine 1 according to the invention is, however, also suitable for other applications.

The electrical machine 1 is preferably in the form of a permanent-magnet electrical drive, in which case the rotor 2 may be configured in the form of spokes or as a collector. In this exemplary embodiment, the rotor 2 has a laminate 4 and a multiplicity of further laminates which correspond to the laminate 4. The laminate 4 is in this exemplary embodiment mounted directly on the shaft 3. The laminate 4 is subdivided in a circumferential direction 5 into a plurality of laminate sectors 6, 7, 8, between which magnet pockets 9, 10 are formed. In this case, only the laminate sectors 6, 7, 8 and the magnet pockets 9, 10 are identified, in order to simplify the illustration.

In addition, the laminate 4 has an attachment crown 15, on which a plurality of clamping lugs 16 and centering lugs 17 are formed. The clamping lugs 16 and the centering lugs 17 allow the laminate 4 to be positioned on the shaft 3, and the laminate 4 on the attachment crown 15 to be attached to the shaft 3.

FIG. 1 shows a radial axis 18 of the laminate sector 7. The figure also shows a radial axis 19 of the magnet pocket 10. The laminate sector 7 is symmetrical with respect to the radial axis 18. The magnet pocket 10 is symmetrical with respect to the radial axis 19.

The laminate sector 7 is connected to the attachment crown 15 via a connection element 20. In this exemplary embodiment, the connection element is formed from a main web 21. In this case, the main web 21 extends along the radial axis 18 of the laminate sector 7. The main web 21 is in the form of an elongated and relatively narrow main web 21. This results in a certain distance between the laminate sector 7 and the attachment crown 15. A cavity 22 between a magnet arranged in the magnet pocket 10 and the attachment crown 15 is thus relatively large. Furthermore, this results in a relatively long distance between a magnet such as this and the shaft 3.

Furthermore, the laminate sectors 6, 8 are connected to the attachment crown 15 via connection elements 23, 24. In this exemplary embodiment, the connection elements 23, 24 are designed in a corresponding manner to the connection element 20. However, it is also possible for the connection elements 20, 23, 24 to be formed in two or more different ways.

Figure 2:
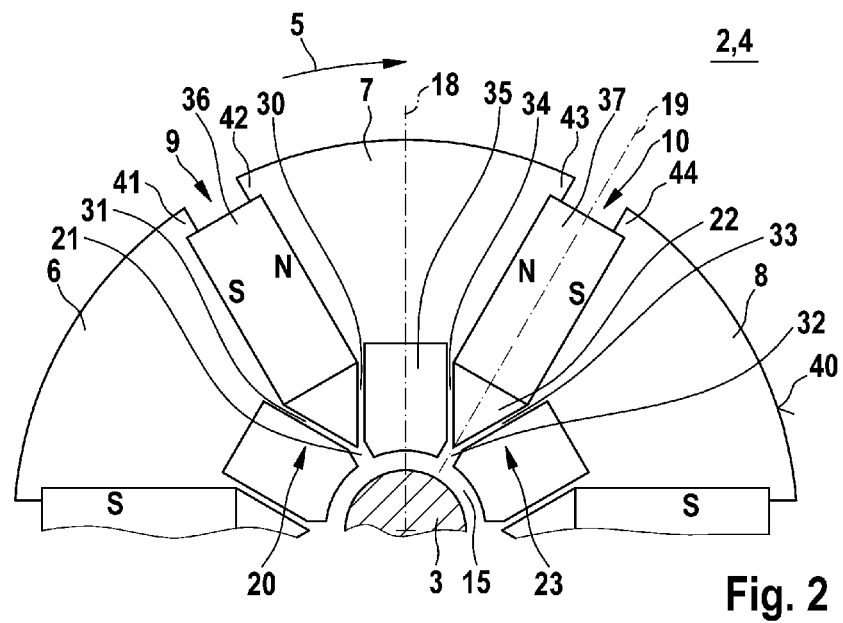
FIG. 2 shows the laminate illustrated in FIG. 1, illustrated in the form of a detail corresponding to a second exemplary embodiment.

FIG. 2 shows the laminate 4 illustrated in FIG. 1 in the form of a detail illustration corresponding to a second exemplary embodiment. In this exemplary embodiment, connection elements 20, 23 are illustrated which, together with further connection elements, connect the laminate sectors 6, 7, 8 to the attachment crown 15. In this case, the laminate sector 7 is connected to the attachment crown 15 both via the connection element 20 and via the connection element 23.

The connection element 20 has the main web 21 as well as a side arm 30 and a side arm 31. In this case, the side arm 30 branches off from the main web 21 in the circumferential direction 5, while the side arm 31 branches off from the main web 21 in the opposite direction to the circumferential direction 5. In this exemplary embodiment, the side arm 30 of the connection element 20 is connected to the laminate sector 7. The side arm 31 of the connection element 20 is connected to the laminate sector 6. The connection element 23 is designed in a corresponding manner to the connection element 20 and has a main web 32 and side arms 33, 34. In this case, the side arm 33 branches off from the main web 32 in the circumferential direction 5, while the side arm 34 branches off from the main web 32 in the opposite direction to the circumferential direction 5.

Therefore, in this exemplary embodiment, the laminate sector 7 is connected on the one hand via the side arm 30 and the main web 32 of the connection element 20 to the attachment crown 15, and is connected on the other hand via the side arm 34 and the main web 32 of the connection element 23 to the attachment crown 15. The laminate sector 7 is therefore connected directly to the attachment crown 15 via two connection elements 20, 23.

The laminate sector 7, the side arms 30, 34, the main webs 21, 32 and the attachment crown 15 surround a cutout 35 in the laminate 4.

Permanent magnets 36, 37 are arranged in the magnet pockets 9, 10, with the magnetic polarity of the permanent magnets 36, 37 being illustrated by the letters "N" for north pole and "S" for south pole. Magnetic flux losses occur because of flux through the material of the laminate 4 from north to south. For example, flux occurs from the laminate sector 7, to which the north poles of the magnets 36, 37 are adjacent, to the laminate sectors 6, 8, to which, inter alia, the south poles of the magnets 36, 37 are adjacent.

By way of example, a magnetic flux occurs from the laminate sector 7 via the side arm 30 and the side arm 31 of the connection element 20. However, the side arms 30, 31 are relatively thin, as a result of which any flux loss relating to them is reduced. A flux via the shaft 3 is reduced by the relatively large cutout 35 and the relatively small main webs 21, 32 of the connection elements 20, 23. Flux losses are therefore reduced, thus improving the method of operation of the electrical machine 1.

In the exemplary embodiment illustrated in FIG. 2, the connection elements 20, 23 are Y-shaped. This results in particularly high strength. Furthermore, a long distance from the shaft 3 can be achieved in this way.

With respect to a specific distance along the radial axis 19, which is ensured by the connection element 23, the side arms 33, 34 are preferably relatively long, while the main web 32 is relatively short. This applies in a corresponding manner to the connection element 20. This makes it possible to further reduce flux losses since the path of the magnetic flux from the laminate sector 7 to the laminate sectors 6, 8 via the connection elements 20, 23 can be lengthened in this way.

In this exemplary embodiment, the laminate sectors 6, 7, 8 are not connected to one another on a circumference 40 of the laminate 4 at the magnet pockets 9, 10. However, holding stops 41, 42 are provided on the magnet pocket 9, on which holding stops 41, 42 the magnet 36 which is arranged in the magnet pocket 9 is supported on the outside. Correspondingly, holding stops 43, 44 are provided on the magnet pocket 10, and are used to hold the magnet 37. The holding stop 41 is formed on the laminate sector 6. The holding stops 42, 43 are formed on the laminate sector 7. The holding stop 44 is formed on the laminate sector 8.

Figure 3:
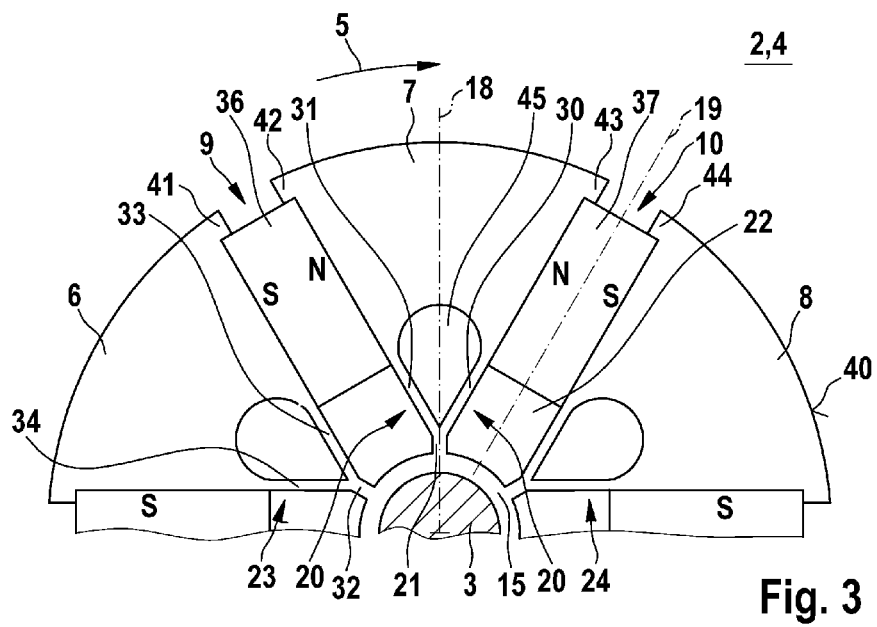
FIG. 3 shows the laminate illustrated in FIG. 1, illustrated in the form of a detail corresponding to a third exemplary embodiment.

FIG. 3 shows the laminate 4, as illustrated in FIG. 1, of a rotor 2 in the form of a detailed illustration corresponding to a third exemplary embodiment. In this exemplary embodiment, each of the laminate sectors 6, 7, 8 is individually connected to the attachment crown 15 via a connection element 20, 23, 24. By way of example, the laminate sector 7 is connected directly to the attachment crown 15 only via the connection element 20. The main web 21 of the connection element 20 is arranged at least approximately on the radial axis 18 of the laminate sector 7. The side arms 30, 31 of the connection element 20 lead to the laminate sector 7, with the side arms 30, 31 and the laminate sector 7 to which the side arms 30, 31 lead surrounding a cutout 45 in the laminate 4. The cutout 45 is symmetrical with respect to the radial axis 18. Furthermore, the cutout 45 is in the form of a droplet, because of the V-shaped arrangement of the two side arms 30, 31. However, the cutout 45 can also be formed in a different manner, in particular in the form of a triangular cutout 45.

The Y-shaped configuration of the connection element 20 with the main web 21 and the side arms 30, 31 results in high mechanical strength. This mechanical strength can be optimized in particular by a relatively short main web 21 and correspondingly long side arms 30, 31. The flux losses in this configuration are considerably reduced. This is because flux losses resulting from magnetic flux from the laminate sector 7 to, for example, the laminate sector 6 can pass only over a particularly long path length through the material of the laminate 4. This path runs not only through the two side arms 30, 31 of the connection element 20 but also through the main web 21. In addition, a certain path length must be traveled via the attachment crown 15 and then via the entire connection element 23. The path length in this embodiment is therefore particularly long, and the flux losses are correspondingly low.

Figure 4:
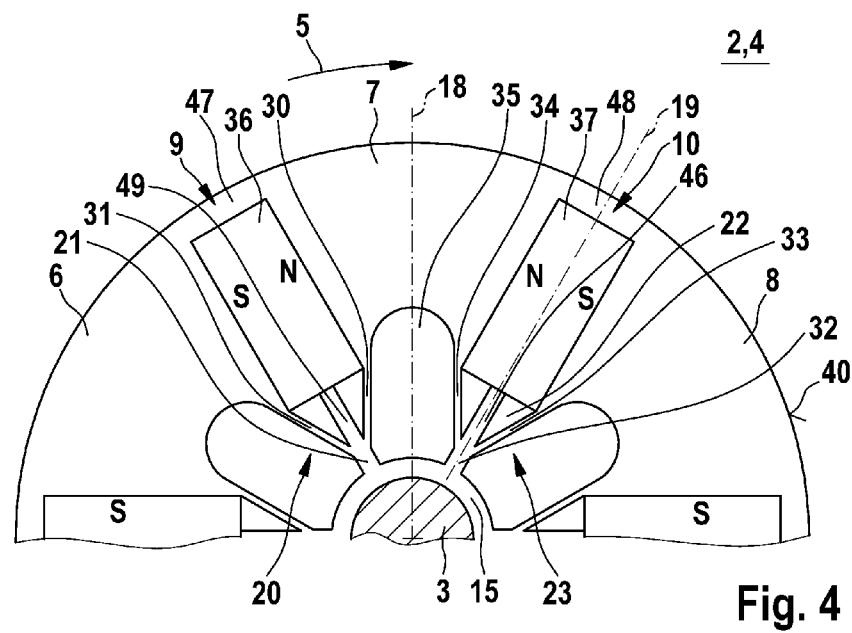
FIG. 4 shows the laminate illustrated in FIG. 1, illustrated in the form of a detail corresponding to a fourth exemplary embodiment.

FIG. 4 shows the laminate 4, as illustrated in FIG. 1, of the rotor 2 in the form of a detail illustration corresponding to a fourth exemplary embodiment. By way of example, in this exemplary embodiment, the laminate sector 7 is connected via the connection elements 20, 23 to the attachment crown 15 and to the other laminate sectors 6, 8.

The main webs 21, 32 of the connection elements 20, 23 are connected to the attachment crown 15. The side arms 30, 31, 33, 34 of the connection elements 20, 23 are connected to the laminate sectors 6, 7, 8. Therefore, the main webs 21, 32 lead to the attachment crown, while the side arms 30, 31, 33, 34 lead to the laminate sectors 6, 7, 8. In this case, the side arms 30, 31 of the connection element 20 lead to mutually adjacent laminate sectors 6, 7. Correspondingly, the side arms 33, 34 of the connection element 23 lead to mutually adjacent laminate sectors 7, 8.

By way of example, in this exemplary embodiment, the main web 32 of the connection element 23 is arranged on the radial axis 19 of the magnet pocket 10, and therefore of the magnet 37. Furthermore, the main web 32 has a clamping projection 46, which extends along the radial axis 19 of the magnet pocket 10. In this case, the clamping projection 46 extends as far as the magnet 37 which is arranged in the magnet pocket 10.

In this exemplary embodiment, the laminate 4 has a closed circumference 40. In this case, the laminate 4 has webs 47, 48 which are arranged on the outside on the circumference 40 on the magnet pockets 9, 10. The magnets 36, 37 are supported radially on the outside on the webs 47, 48. The magnet 37 is therefore clamped in between the clamping projection 46 and the web 48. In this case, further clamping projections on further laminates, together with the clamping projection 46, can hold the magnets 37 in the magnet pocket 10.

Correspondingly, the main web 21 of the connection element 20 has a clamping projection 49. The configuration of the connection element 20 with respect to the clamping projection 49 and the function for holding the magnet 36 in the magnet pocket 9 are implemented in a corresponding manner.

In this exemplary embodiment, the connection elements 20, 23 are only partially Y-shaped. In this case, the main web 21 together with the side arms 30, 31 of the connection element 20 are Y-shaped, with the clamping projection 49 being provided in addition.

Figure 5:
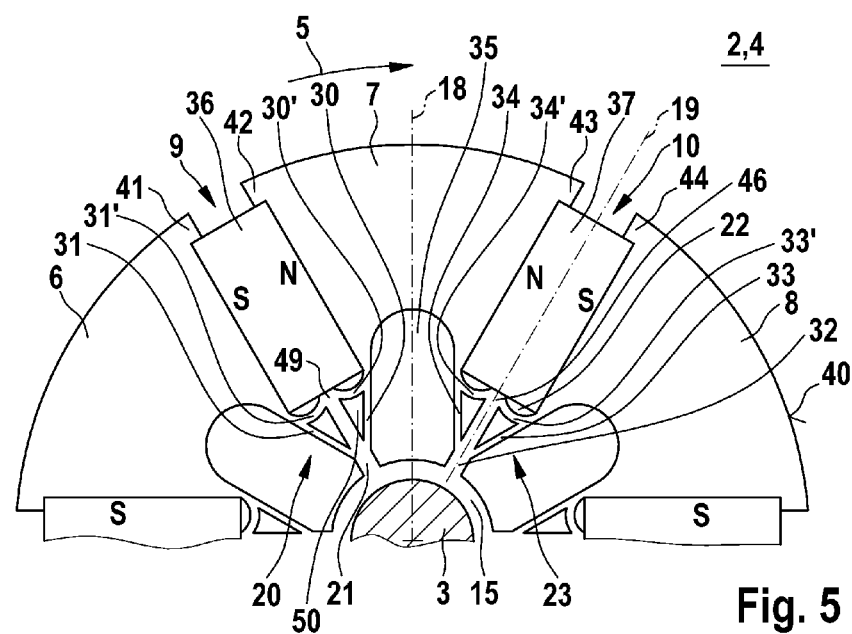
FIG. 5 shows the laminate illustrated in FIG. 1, illustrated in the form of a detail corresponding to a fifth exemplary embodiment.

FIG. 5 shows a laminate 4 of a rotor 2 of the electrical machine 1 as illustrated in FIG. 1, corresponding to a fifth exemplary embodiment. In this exemplary embodiment, the laminate sectors 6, 7 are connected to the attachment crown 15 via the connection element 20. Furthermore, the laminate sectors 7, 8 are connected to the attachment crown 15 via the connection element 23. In this case, the connection element 20 has the side arms 30, 31. In this case, the side arm 30 branches off from the main web 21 in the circumferential direction 5, while the side arm 31 branches off from the main web 21 in the opposite direction to the circumferential direction 5. Furthermore, further side arms 30', 31' are provided. In this case, the side arm 30' branches off from the main web 21 in the circumferential direction 5. The side arm 31' branches off from the main web 21 in the opposite direction to the circumferential direction 5. In this case, the side arms 30, 30' which branch off from the main web 21 in the circumferential direction 5 branch off from the main web 21 at a distance from one another. Furthermore, the two side arms 30, 30' run together at least in places, and in this exemplary embodiment completely, in the circumferential direction 5. The side arms 30, 30' and the main web 21 therefore enclose a cutout 50, which is in the form of a distorted triangle.

Correspondingly, the side arms 31, 31' of the connection element 20 branch off from the main web 21 at a distance from one another in the opposite direction to the circumferential direction 5. In this case, the side arms 31, 31' run together in the opposite direction to the circumferential direction 5.

The connection element 23 likewise has further side arms 33', 34'. The connection element 23 is designed in a corresponding manner to the connection element 20. In addition, the connection elements 20, 23 have short clamping projections 46, 49 on their main webs 21, 32, in order to hold the permanent magnets 36, 37 in the magnet pockets 9, 10.

In this exemplary embodiment, the connection elements 20, 23 are approximately Y-shaped, as a result of which mechanical loads which occur in and in the opposite direction to the circumferential direction 5, in particular mechanical stresses, can advantageously be transmitted from the laminate sectors 6, 7, 8 to the attachment crown 15. Furthermore, the mechanical stresses can be transmitted between the laminate sectors 6, 7, 8. This results in the laminate 4 having a high mechanical load capacity during operation of the electrical machine 1, with any stray flux which occurs being reduced.

The described exemplary embodiments therefore result in magnetic flux being guided mainly via an air gap on the circumference 40 of the laminate 4 and the stator of the electrical machine 1. Any stray flux which occurs in this case is largely prevented.

Different laminate shapes of the individual laminates which are in layers one behind the other of the shaft 3 can be used for the configuration of the rotor 2 of the electrical machine 1. In particular, some of the laminates of the rotor 2 may be open on the circumference 40, as is the case in the exemplary embodiments described with reference to FIGS. 1, 2, 3 and 5. Other laminates may be closed on the circumference 40, as is the case in the exemplary embodiment described with reference to FIG. 4. A single laminate 4 is in this case preferably either closed completely on its circumference 40, or is open at each magnet pocket, in particular the magnet pockets 9, 10. In this case, holding stops 41 to 44 or webs 47, 48 are provided on all the magnet pockets 9, 10.

A single laminate 4 of the rotor 2 is preferably formed integrally. In this case, a laminate 4 such as this is preferably stamped from sheet metal, in which case all the structures can be formed by stamping, and in particular the connection elements 20, 23, 24, which are described in a different form on the basis of FIGS. 1 to 5, can be formed by stamping. In this case, modifications are also possible, depending on the application. In particular, a configuration with more than two side arms 30, 31, for example a configuration with side arms 30, 30', 31, 31' as is illustrated in FIG. 5, can also be used for the arrangement of the connection element 20 as shown in FIG. 3, in which in each case one of the laminate sectors 6, 7, 8 is connected to the attachment crown 15 via one and only one connection element 20, 23, 24.

The pole linking is also suitable for a consequent-pole arrangement. In this case, only every second rotor pole is formed by a permanent magnet 36, 37. The rotor poles without magnets are in this case necessarily formed by the magnetic return path.

Furthermore, the pole linking can also be combined with other measures. For example, a combination with any desired combinations of webs above and below the magnets 36, 37 which are inserted into the rotor 2 in the axial direction is feasible, and it is also possible for webs to be omitted. Specifically, a configuration with internal webs can also be implemented in order to hold the magnets 36, 37 in the magnet pockets 9, 10, corresponding to the external webs 47, 48 on the magnet pockets 9, 10 which are illustrated in FIG. 4. Furthermore, other measures can also be implemented for clamping the magnets 36, 37 in the magnet pockets 9, 10. Furthermore, the attachment crown 15 may be formed in a different manner, in order to form an interface between the laminate 4 and the shaft 3.

It is also possible for remaining openings or gaps to be filled with plastic or a clamping substance. Specifically, the magnets 36, 37 can be fixed by adhesive bonding, extrusion coating with plastic or the like. However, additional components can also be used for attachment of the magnets 36, 37, in particular spring elements. Holding stops which are in the form of internal holding stops on the laminate 4 can also be used for attachment of the magnets 36, 37.

In addition, the laminate 4 may have contours in a different form on the circumference 40. Specifically, a suitable contour can be provided in order to reduce the locking torque, for example a sinusoidal pole contour.

In order to further reduce the flux losses, that is to say a stray flux, it is also possible to use laminates 4 during construction of the rotor 2 in which the pole linking is dispensed with in one or more metal sheets in the axial direction. The metal laminate sheets, which are then loose, may, for example, be mounted in the laminate core of the rotor 2, for example, by packaging points or via closed external webs. Correspondingly, the magnet attachment may be provided in only some metal sheets. In addition, it is not necessary to provide every connection element 20, 23, 24 in a laminate 4. Specifically, only every second or third connection element may be provided. In this case, laminate sectors 6, 7, 8 can be attached to the attachment crown 15 via other laminates.

The invention is not restricted to the described exemplary embodiments.

What is claimed is:

1. An electrical machine (1) having a rotor (2) which has a plurality of laminates (4), with one laminate (4) of the rotor (2) being divided into a plurality of laminate sectors (6, 7, 8) in a circumferential direction (5), between which laminate sectors (6, 7, 8) magnet pockets (9, 10) are formed, with the laminate (4) having an inner attachment crown (15), with the laminate (4) having connection elements (20, 23, 24) which connect the laminate sectors (6, 7, 8) to the attachment crown (15), and with a first one of the connection elements (20) having a main web (21), at least one side arm (30) which branches off from the main web (21) in the circumferential direction (5), and at least one side arm (31) which branches off from the main web (21) in an opposite direction to the circumferential direction (5), the laminate (4) being a single piece.

2. The electrical machine as claimed in claim 1, characterized in that one and only one side arm (30) branches off from the main web (21) in the circumferential direction (5), and in that one and only one side arm (31) branches off from the main web (21) in the opposite direction to the circumferential direction (5).

3. The electrical machine as claimed in claim 1, characterized in that a further side arm (30') branches off from the main web (21) at a distance from the side arm (30) in the circumferential direction (5), and in that a further side arm (31') branches off from the main web (21) at a distance from the side arm (31) in the opposite direction to the circumferential direction (5).

4. The electrical machine as claimed in claim 3, characterized in that the side arm (30) and the further side arm (30') run together at least in places in the circumferential direction (5), and in that the side arm (31) and the further side arm (31') run together at least in places in the opposite direction to the circumferential direction (5).

5. The electrical machine as claimed in claim 1, characterized in that the main web (21) of the first connection element (20) leads to the attachment crown (15).

6. The electrical machine as claimed in clam 5, characterized in that the side arms (30, 31) of the first connection element (20) each lead to one laminate sector (7), and in that the side arms (30, 31) of the first connection element (20) and the laminate sector (7) to which the side arms (30, 31) of the first connection element (20) lead surround a cutout (45) in the laminate (4).

7. The electrical machine as claimed in claim 5, characterized in that the side arms (30, 31) of the first connection element (20) each lead to adjacent laminate sectors (6, 7).

8. The electrical machine as claimed in claim 7, further including a second main web (32) of a second one of the connection elements (23) at least approximately on a radial axis (19) of a magnet pocket (10), which is arranged between adjacent laminate sectors (7, 8) to which side arms (33, 34) of the second connection element (23) lead.

9. The electrical machine as claimed in claim 8, characterized in that the second main web (32) has a clamping projection (46), which extends along the radial axis (19) to the magnet pocket (10), and in that a magnet (37) which is arranged in the magnet pocket (10) is held in the magnet pocket (10) by the clamping projection (46).

10. The electrical machine as claimed in claim 1, characterized in that the first connection element (20) together with the main web (21) and the side arms (30, 31) is approximately Y-shaped.

11. The electrical machine as claimed in claim 1, characterized in that a shaft (3) is provided, and in that the attachment crown (15) of the laminate (4) at least one of
rests at least indirectly on the shaft (3), and
is at least indirectly attached to the shaft (3).

12. The electrical machine as claimed in claim 1, characterized in that the laminate sectors (6, 7, 8) are connected to one another on a circumference (40) of the laminate (4) on the magnet pockets (9, 10) via webs (47, 48) which are arranged on the outside, or in that the laminate sectors (6, 7, 8) are not connected to one another on the circumference (40) of the laminate (4) at the magnet pockets (9, 10), and holding stops (41, 42, 43, and 44) are provided, on which magnets (36, 37), which are arranged in the magnet pockets (9, 10), are supported.

13. The electrical machine as claimed in claim 1, characterized in that the machine is an electric motor.

14. The electrical machine as claimed in claim 1, characterized in that one and only one side arm (30) branches off from the main web (21) in the circumferential direction (5).

15. The electrical machine as claimed in claim 1, characterized in that one and only one side arm (31) branches off from the main web (21) in the opposite direction to the circumferential direction (5).

16. The electrical machine as claimed in claim 1, characterized in that a further side arm (30') branches off from the main web (21) at a distance from the side arm (30) in the circumferential direction (5).

17. The electrical machine as claimed in claim 16, characterized in that the side arm (30) and the further side arm (30') run together at least in places in the circumferential direction (5).

18. The electrical machine as claimed in claim 1, characterized in that a further side arm (31') branches off from the main web (21) at a distance from the side arm (31) in the opposite direction to the circumferential direction (5).

19. The electrical machine as claimed in claim 18, characterized in that in that the side arm (31) and the further side arm (31') run together at least in places in the opposite direction to the circumferential direction (5).

20. The electrical machine as claimed in claim 1, wherein the laminate (4) is punched out from a metal sheet.

* * * * *